United States Patent [19]

Fillot

[11] 4,317,010
[45] Feb. 23, 1982

[54] REMOTE MONITORING SYSTEM FOR REMOTE LOCATING AND GAIN REGULATING OF AMPLIFICATION CIRCUITS IN DATA TRANSMISSION LINE

[76] Inventor: Jean-Jacques Y. Fillot, 2 Residence Grand Champ, rue des Entrees, Marly-le-Roi, France, 78160

[21] Appl. No.: 107,418

[22] Filed: Dec. 26, 1979

[30] Foreign Application Priority Data

Dec. 22, 1978 [FR] France ................................ 78 36097

[51] Int. Cl.$^3$ ............................................... H04M 3/32
[52] U.S. Cl. ...................... 179/175.31 R; 179/175.3 F
[58] Field of Search ................ 179/175.31 R, 175.3 F, 179/175.3 R; 370/15

[56] References Cited

U.S. PATENT DOCUMENTS

| | | | |
|---|---|---|---|
| 3,692,964 | 9/1972 | Camiciottoli et al. | 179/175.31 R |
| 3,942,137 | 3/1976 | Franco et al. | 179/175.31 R |
| 3,959,606 | 5/1976 | Merlet et al. | 179/175.31 R |
| 4,006,320 | 2/1977 | Markl | 179/175.31 R |
| 4,025,737 | 5/1977 | Brewer | 179/175.31 R |
| 4,161,635 | 7/1979 | Wolaver | 179/175.31 R |
| 4,187,415 | 2/1980 | Boutmy | 179/175.3 F |

FOREIGN PATENT DOCUMENTS 1915867 10/1970 Fed. Rep. of Germany .
608151 12/1978 Switzerland .

OTHER PUBLICATIONS

IBM Technical Disclosure Bulletin, "Test System for FDM Network", vol. 21, No. 9, Feb. 1979.

Cables and Transmission, vol. 29, No. 1, Jan. 1975, pp. 69–108, Platet et al.
Annales de Te'le'communications, vol. 29, No. 11–12, Nov. Dec. 1974, Soulier.
L'onde E'lectrique, vol. 51, pp. 118–127, Feb. 1971, Chalhoub & Franco.

Primary Examiner—Gerald L. Brigance
Attorney, Agent, or Firm—Abraham A. Saffitz

[57] ABSTRACT

The remote monitoring system locates individually the pairs of intermediate amplification circuits in a remote location in the transmission line between a monitoring station and a monitored station in which circuit a fault diminishing amplification is to be located. The monitoring station transmits remote location signals and other control signals which can be mixed with the data signals normally transmitted over the line. The monitoring station analyzes any faults in the signals transmitted and looped in the line and also carries out remote-control of the gain variation of each amplification circuit without normal transmission of the data signals being interrupted. Signals transmitted from by the monitoring station over the forward channel of the line control four loops of the inputs and outputs of a remote located pair of amplification circuits and a gain regulating means inserted in the negative feedback loop, or inserted upstream or downstream of each amplification circuit in order to change its gain. The transmission line is of the analog, digital or digital-analog type and is supported by means of a cable, optical fibres, radio links or the like.

20 Claims, 3 Drawing Figures

REMOTE MONITORING SYSTEM FOR REMOTE LOCATING AND GAIN REGULATING OF AMPLIFICATION CIRCUITS IN DATA TRANSMISSION LINE

BACKGROUND OF THE INVENTION

1. Field of the Invention

This invention relates to a system for remote monitoring a bidirectional digital or analog transmission line between two terminal stations and, more particularly, the detection of faults along the line in order to regulate the gain of the intermediate amplification circuits, such as repeaters, along the line. It generally relates to selective remote location of the intermediate amplification circuits, the looping of the pairs of amplification circuits concerned in both directions of transmission, and regulation of the gains of the intermediate amplification circuits.

2. Description of Prior Art

Generally, the intermediate amplification circuits in a transmission line are each provided with regulating circuits for regulating the amplification gain and are distributed in pairs along the line between the terminal stations which are termed herein as a monitoring station and a monitored station. The monitoring station comprises means whereby remote location signals of the pairs of amplification circuits are transmitted from the monitoring station to the monitored station over the forward transmission channel of the line, means for transmitting at least one test signal over the forward transmission channel, and means for detecting the faults in the information signal normally transmitted over the backward transmission channel from the monitored station to the monitoring station and/or in the test signal after a pair of amplification circuits has been looped through the monitoring station. Each pair of forward and backward intermediate amplification circuits comprises switching means whereby the output of the forward amplification circuit is connected to the input of the backward amplification circuit by looping through the monitoring station, and means for detecting said remote location signals in order to control the switching means.

Numerous remote monitoring system are known for a transmission line and are distinguished from one another by their methods for the remote location of the line repeaters and, specifically, by the type of remote location signals.

German Patent Application P No. 1915867.9 relates to the remote location of pairs of repeaters in a transmission line of the PCM type. The individual address of each repeater pair is obtained by means of a predetermined voltage level of a control signal which is transmitted by the monitoring station on the forward transmitted channel of the line. A clipper is included in the locating circuit belonging to the repeater pair whose location is to be determined, and detects only the predetermined voltage level in order to carry out the single looping of the output of the forward repeater to the input of the backward repeater.

Also, and contrary to the recommendations of the Consultative Committee International Telegraph and Telephone (C.C.I.T.T.), the test pulse signal transmitted by the monitoring station according to the German Patent Application P No. 1915867.9 is at the same frequency of those normally transmitted in the transmission line. This means that the remote location of the repeaters can be carried out only after stoppage of the normal data transmission on the line.

Swiss Patent Application No. 608151 also relates to a selective remote location of a pair of repeaters in a PCM digital line. Each pair of repeaters is remote located by means of a specific address word which is transmitted from the monitoring station over the forward transmission channel of the line and which is detected in a monitoring circuit of the repeater pair. The remote location procedure also comprises single looping of the output of the forward repeater to the input of the backward repeater.

Another remote monitoring system of the kind defined hereinabove is described in U.S. Pat. No. 4,187,415, issued Feb. 5, 1980. This system relates to data transmission lines, such as telephone channels, in analog form or digital form of the PCM type. For remote locating a pair of intermediate amplification circuits, after detection of a transmission fault in the line, either by the monitoring station or by the monitored station, a first remote location signal comprising low-frequency modulated pulses, e.g. in the case of a cable link, is continuously transmitted by the monitoring station over the forward transmission channel in order to effect the above-mentioned connection of all the pairs of intermediate amplification circuits. At the pre-looping stage, only the pair of intermediate amplification circuits immediately adjacent the monitoring station is located. The input and the output of two successive intermediate amplification circuits on the backward transmission channel are disconnected in such remote location so that the interruption of the data signal transmission over the two channels must then be signalled downstream of the monitored station on the forward channel and downstream of the monitoring station on the backward channel. If the transmission fault is not detected again after a test signal of a type similar to that of the data signal, a succession of second remote location signals modulated at a frequency different from that of the first remote location signal is transmitted on the backward channel in the forward direction. Each second remote location signal enables the previously looped pair of amplification circuits to be unlooped and the immediately following pair to be looped through the monitoring station. For remote locating any pair of intermediate amplification circuits these successive simultaneous looping and unlooping processes have to be repeated from the amplification circuit pair adjacent the monitoring station. Stoppage of the transmission of the first remote location signal causes the unlooping of all the pairs of intermediate amplification circuits.

Another remote location system for a digital data transmission line uses solely low-frequency remote location signals, i.e. signals which can be mixed with the data signals, and is disclosed in an article by Frédéric PLATET et al, published in the French periodical "Cables & Transmission", volume 29, January 1975, No. 1, pages 69 to 108. In this system, a single remote location signal at the low-frequency of 500 Hz is transmitted on the forward transmission channel of the line. During the continuous transmission of this signal, the first pair of intermediate amplification circuits, i.e. repeaters, passes into the loop position and interrupts the transmission of the remote location signal. A short interruption of the remote-location signal results in unlooping of the first pair of repeaters and restores the transmission to the next forward repeater, which is looped to the associated backward repeater when transmission of the remote location signal is restored. When the interruption of the remote location signal lasts for a sufficiently long period, all the pairs of repeaters are unlooped.

In the latter two systems of remote monitoring, it appears that in order to carry out remote location of any pair of intermediate amplification circuits, it is necessary to proceed step-wise, or more specifically to loop and unloop all the repeater pairs between the monitoring station and the repeater pair in question. Also, remote location of a repeater pair for the purposes of analyzing its insertion losses or transmission losses, adversely requires interruption of the normal transmission of the data signals on the line.

Also, in the four remote monitoring systems referred to hereinabove, the terminal monitoring station is adapted only to detect the faults and in no case it is able to modify the gain of each intermediate amplification circuit independently of the others.

The reason for this is that an intermediate amplification circuit of this kind is designed with a negative feedback loop whereby the gain of the intermediate amplification circuit can be modified automatically from a pilot signal which is transmitted continuously in the line. It is known that such local automatic gain regulation is required in order to correct the attenuation of the data which is caused by each section of the line. Apart from insertion losses of the line, the causes of this attenuation lie with temperature variations, variations in the supply voltage, ageing of the repeater components, and so on. Each gain regulating circuit associated with an intermediate amplification circuit is designed so that the noise in the line is at a minimum when the line is "aligned", i.e. when the contribution of each regulating circuit results in the same level at its channel output as the level initially transmitted to the input of the channel on the sending station side. With regard to the general construction of a gain regulating circuit of this kind reference may be made to an article by Henri SOULIER, published in the French periodical "Annales des Télécommunications", volume 29, No. 11–12, November-December 1974, and to paragraph 2.4.2. of the article by C. CHALHOUB and P. FRANCO, published in the French journal "L'onde électrique", volume 51, pages 118 to 127, February 1971.

A gain regulating circuit generally comprises a bandpass filter which samples a pilot signal at the output of the amplification circuit. The pilot signal is amplified and rectified, then compared with a reference voltage. The level difference arising out of this comparison enables the gain of the amplification circuit to be corrected by acting on a variable equalization network which comprises one or more variable elements. These variable elements are inserted in the negative feedback loop of the amplification circuit and are varicap diodes or thermistors, for example. In a regulating circuit of this kind, the amplification gain variation curve must be a function of the attenuation due to the nature and the length of the channel section upstream of the amplification circuit. Consequently, before it is used, the topography of the transmission line between the terminal stations and the nature of the line sections must be accurately known if the level of the reference voltage is to be suitably selected for each regulating circuit.

To obviate this disadvantage, it has been proposed to interconnect between the input of each intermediate amplification circuit and the corresponding upstream channel section a variable section simulator such that the system comprising the section plus the simulator has a fixed attenuation curve which is equalized in the amplification circuit. A simulator of this kind is described, for example, in the article by Y. SAMOEL, pages 174 to 183 and in the article by F. PLATET et al, pages 332 to 371, published in the French periodical "Cables & Transmission", special issue, December 1975. This organization enables all the output signals of the intermediate amplification circuits to be positioned at the same level by comparison with a same predetermined reference voltage.

Other gain regulating circuits are based on measuring the temperature at the location of the intermediate amplification circuit on the hypothesis that the temperature variations at that point of the line are identical to those of the upstream line section, but this is not always true. Since the line is perfectly aligned when it is put into service, the temperature variation data is converted to a variation of the attenuation of the line section.

In remote monitoring systems using such gain regulating circuits, the monitoring terminal station does not have separate data concerning the gain of each intermediate amplification circuit. For example, after a change of line section associated with an amplification circuit or after associated modifications such as the insertion of other additional amplification circuits in a repeater relay or unit for the commissioning of a new line included in one and the same cable as the line in question, the reference voltage or the variable elements of each regulating circuit must be corrected in situ in order to re-align the line.

OBJECTS OF THE INVENTION

The principal object of the present invention is to provide a remote monitoring system for remote controlling the amplification gain variation in the sections of a bidirectional transmission line.

Another object of the invention is to remote control the amplification gain variation of each forward or backward intermediate amplification circuit of a transmission line from the monitoring terminal station.

Another object of the invention is to remote regulate the amplification gain of each intermediate amplification circuit without it being necessary to interrupt the data signal normally transmitted on the line.

A further object of the invention is to detect the transmission faults in the transmission line by different looping of the inputs and outputs of the forward and backward intermediate amplification circuits of a pair which is individually addressed from the monitoring station.

Yet another object of the invention is to remote locate and remote control different loops of each pair of forward and backward intermediate amplification circuits.

Another object of the invention is to provide intermediate amplification circuits of a transmission line which include gain regulating means which are remote controlled by the monitoring station.

Another object of the invention is to provide switching means which are included in each pair of forward and backward intermediate amplification circuits of a transmission line and which enable the inputs and outputs of the two intermediate amplification circuits to be connected therebetween according four possibilities.

Another object of the invention is to provide intermediate amplification circuit switching means which detect and deliver to the monitoring station only test or pilot signals.

SUMMARY OF THE INVENTION

In accordance with the objects of the present invention, a remote monitoring system monitors remote line sections of a bidirectional data transmission line which is interconnected between a monitoring station and a monitored station, each of said line sections comprising:
- a forward transmission channel section conveying in the forward direction from said monitoring station to said monitored station a first data signal;
- a forward amplification circuit comprising means for amplifying said first data signal and means for regulating the gain of said forward circuit amplifying means;
- a backward transmission channel section conveying in the backward direction from said monitored station to said monitoring station a second data signal;
- a backward amplification circuit comprising means for amplifying said second data signal and means for regulating the gain of said backward circuit amplifying means;
- means for detecting an address signal delivered on the forward transmission channel of said line from monitoring station; and
- switching means controlled by said address signal detecting means for connecting the output of said forward circuit amplifying means to the input of said backward circuit amplifying means; said monitoring station comprising:
- means for delivering said address signals in said forward direction on said forward transmission channel in order individually to provide remote location of a line section;
- means for delivering at least a test signal and a pilot signal over said forward transmission channel;
- means for detecting transmission faults in said second data signal, said test signal after said forward and backward amplification circuits of a line section have been looped through said monitoring station, and said pilot signal retransmitted on the backward transmission channel of said line from said monitored station;
- means for delivering address and gain variation control signals for one and/or another amplification circuit gain regulating means of said remote located line section in said forward direction of said forward transmission channel after looping of said remote located line section through said monitoring station;
- each of said line sections comprising also means controlled by said own address signal detecting means for validating all the amplification circuit address and gain variation control signals relating to said line section; and
- means for controlling said gain regulating means of each of said backward and forward amplification circuits of said line section in response to the validated amplification circuit address and gain variation control signals.

As a result, unlike certain prior-art systems, remote location of a pair of intermediate amplification circuits, i.e. a line section, is effected by the transmission of an address signal which identifies said pair without it being necessary to carry out successive looping (or pre-looping) and unlooping operations on the preceding pairs.

As soon as a transmission fault is detected, e.g. a data signal error rate outside a given range or an undesirable level of a regulating pilot signal which is transmitted continuously in the line, the monitoring station triggers an automatic gain regulating sequence by carrying out successive remote location of the pairs of amplification circuits. However, a fault may be produced by one or more line section and/or amplification circuits and the origin of the attenuation in the line must be located precisely.

To this end, the present invention proposes switching means for equiping the monitoring station with a transmission capability for generating loop switching signals which can serve to can be transmitted on the forward transmission channel to enable the attenuation due to a channel section and the attenuation due to either a forward or backward amplification circuit of a line section to be distinguished. These loop switching signals preferably allow remote control of the four following loopings of the pilot signal and/or of the test signal or signals in a pair of intermediate amplification circuits:
- (a) connection of the output of the forward amplification circuit either to the input or to the output of the backward amplification circuit;
- (b) connection of the input of the forward amplification circuit either to the input or to the output of the backward amplification circuit.

Analysis of the test signal or signals thus looped in different ways in the remote located pair of amplification circuits indicates accurately whether it is a channel section or an amplification circuit of the remote located line section which is defective. If the fault originates from an undesirable attenuation of an amplification circuit, the monitoring station by comparison with a pre-recorded gain regulating program determines whether the gain of the amplification circuit should be increased or decreased by a given gain deviation and whether, where applicable, other amplification circuits should have their gain corrected. To this end, the monitoring station transmits an address signal which identifies the forward or backward amplification circuit for correcting in the remote located pair, and also transmits one or more gain variation control signals. For example, a variable attenuator interconnected on the line upstream or downstream of the amplification circuit or alternatively an adjustable element or a resistor circuit interconnected in the negative feedback loop of the amplification circuit is suitably controlled in dependence on said gain deviation and, if necessary, re-corrected until the line or at least the amplification circuit in question satisfies the normal transmission conditions.

All these steps, i.e. remote locating or addressing, looping and unlooping, and gain regulating, are carried out without interferring with the transmission of the first and second data signals. According to the invention, the address and control signals are of the binary coded type and are modulated at frequencies outside the frequency ranges or ranges of the data signal spectrum. The same applies to the pilot signal and any test signals, which are preferably modulated at frequencies included between the frequency ranges of the data signals.

Other features, advantages and objects of this invention will be more clearly apparent from the following more particular description of one preferred exemplified embodiment as illustrated in the accompanying drawings.

DESCRIPTION OF THE PREFERRED EMBODIMENT

Hereinafter, the term "data" applies equally to data of the PCM digital type or of analog type originating from audio-frequency signals which are transmitted on telephone subscriber channels or originating from signals which are transmitted on alpha-numerical information channels. All the address, switching control and gain variation control signals are on the binary code type, can be superimposed on, or mixed with, the data signals, and are modulated at carrier frequencies outside the frequency ranges of the data signal. The transmission line may be of the analog, digital or hybrid type. A hybrid transmission line includes analog transmission line parts between the intermediate amplification circuit pairs and digital transmission parts designating the intermediate amplification circuits after analog-to-digital conversion and before digital-to-analog conversion. The wording "intermediate amplification circuit" refers equally to the repeaters and, where applicable, the regenerators of a cable line, or an optical fibres line, or the repeating and regenerating stations of a radio link. The intermediate amplification circuits may be supplied locally or remote supplied from the monitoring station either by the link support, if the link is of the cable type, or by a line adapted to transmission of the remote supply current. On the other hand, the address and control signals are transmitted through the link support carrying the data signals.

Figure 1:
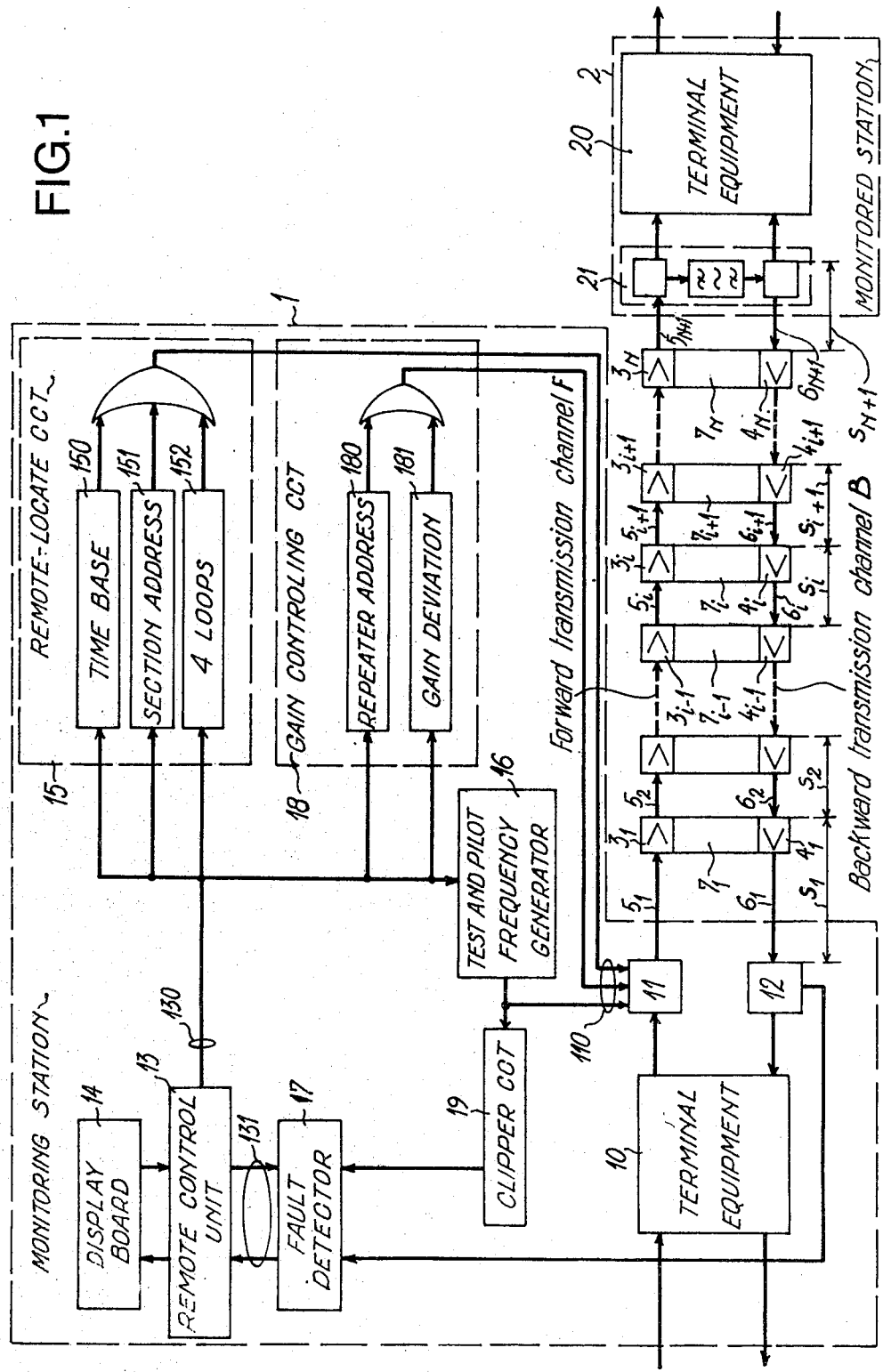
FIG. 1 is a schematic block diagram of a system for remote monitoring a transmission line between a terminal monitoring station and a terminal monitored station and shows more particularly the remote monitoring circuits of the monitoring station.

The data transmission line is shown schematically in FIG. 1 and is a cable link with balanced pairs, although, as already stated, the invention is not limited to this type of link. The line connects a terminal monitoring station 1 and a terminal monitored station 2. A forward transmission channel F and a backward transmission channel B form the line. The forward channel F conveys a first data signal from the monitoring station 1 to the monitored station 2 through N intermediate amplification circuits or forward repeaters $3_1$ to $3_N$. The backward channel B transmits a second data signal from the monitored station 2 to the monitoring station 1 through N intermediate amplification circuits or backward repeaters $4_1$ to $4_N$. The line F-B is thus divided into N+1 line sections $S_1$ to $S_{N+1}$ which are generally equally distributed and are numbered in the forward transmission direction. Each line section $S_1$ to $S_N$ consists of two channel sections $5_1$ to $5_N$ and $6_1$ to $6_N$ which are followed in the forward direction by two repeaters $3_1$ to $3_N$ and $4_1$ to $4_N$ which are respectively associated with the transmission of the data signals in the forward direction F and backward direction B. The last section $S_{N+1}$ consists of a pair of channel sections $5_{N+1}$, $6_{N+1}$ which is interconnected to the last pair of repeaters $3_N$, $4_N$ and to that (not shown) of the terminal equipment 20 of the monitored station 2. On the other hand, the other end of the first pair of channel sections $5_1$, $6_1$ is connected to the repeater pair of the terminal equipment 10 of the monitoring station 1 through an input power-separation filter 11 and an output power-separation filter 12. The filter 11 mixes and the filter 12 separates the address, control and/or test and pilot signals and the data signals which are received upstream in the forward direction F and transmitted downstream in the backward direction B by the monitoring station 1.

Each station 1, 2 comprises in known manner a terminal equipment 10, 20 which is provided with the means required for the normal transmission and reception of the data signals, such as, depending upon the type of data, mixers and frequency separators or multiplexers and demultiplexers, coders and decoders and shaping circuits and, where applicable, remote supply bays which deliver the current through the line to the pairs of repeaters $3_1$-$4_1$ to $3_N$-$4_N$. Also, the monitoring station 1 comprises a central remote-control unit 13 of the micro-processor type which is associated with a display board 14 including a keyboard and a display console. The central remote-control unit is intended to supervise all the stages in the permanent or instantaneous automatic remote monitoring procedure on the line or a preselected section of the line.

According to the invention, when a transmission fault is detected by the monitoring station 1, the latter, either automatically or at the operator's request via the keyboard of the display board 14, triggers a sequence comprising at least a succession of following order signals relating to a line section $S_i$:

Through the bus 130:
 (a) Remote location orders in respect of a pair of repeaters $3_i$-$4_i$ to a remote location circuit 15 inside which:
  (a1) a time base 150 and a section address register 151 simultaneously transmit a clock signal and a remote-location signal carrying the address in a predetermined code or the identification number i of the section $S_i$ (in binary coded decimal code BCD) and
  (a2) a loop register 152 transmits a first loop switching signal in order to control a first looping out of four in respect of the section $S_i$ through the monitoring station 1;
 (b) Where applicable, orders to a predetermined test and pilot frequency signal generator 16 for the purposes of extra tests in addition to those relating either to a pilot regulating signal transmitted permanently or temporarily during the remote location procedure or to the backward and/or forward data signal at the monitoring and/or monitored station;
 (c) Through the bus 131, simultaneously with the transmission of the test and/or pilot signals, a test initialization order to a fault detector 17 which analyzes the transmission characteristics of the test and/or pilot signals looped in the remote located section $S_i$ and which may detect any transmission fault, the results of these tests being transmitted via the bus 131 to the central unit 13;
 (d) This is followed by three repeats similar to the sequence of orders in the above paragraphs (a2), (b) and (c), in order to analyze the transmission according to the three other types of loop in respect of the section $S_i$, which will be defined hereinafter; at this stage, if the central unit 13 has detected a fault due to attenuation of one or both channel sections $5_i$, $6_i$ which cannot be corrected by a modification of the gain of one repeater or repeaters $3_i$, $4_i$, the unit 13 indicates this via the board 14 to the operator, who will carry out the operations required for testing and maintenance in situ; on the other hand, if the unit 13 has detected an attenuation due to one of the channel sections and/or to one of the repeaters which can be corrected by a suitable modification of the gain of the latter, the central unit transmits the following orders via the bus 130;

(e) Gain variation orders to a gain variation controlling circuit 18 in which:

(e1) a repeater address register 180 in which the address for a repeater comprises a first part designating the address of the line section and a second part distinguishing a forward repeater with regard to a backward repeater, transmits the address of the forward repeater or of the backward repeater of which the gain is to be changed; and (e2) in this examplified embodiment, a gain deviation register 181, the positive or negative value of which indicates whether the gain of the addressed repeater is to increase or decrease, transmits said value step-by-step in the form of a sequence of gain variation control signals, the number of which is proportional to the gain deviation;

(f) Finally, the re-transmission of the address i of the line section $S_i$ by the register 151 controls the unlooping of the repeaters $3_i$ and $4_i$.

In an automatic regulation procedure, since the central remote control unit 17 stores the current value of the gain of each repeater, the central unit will automatically decide—by comparison with predetermined gain value range of the repeaters when the link is "lined up"—whether the correction of the gain of one repeater should entail correction of the others. Generally, the line sections $S_1$ to $S_{N+1}$ are successively regulated, starting with the first $S_1$ in the sequence defined hereinabove. In a maintenance operation relating to the remote monitoring of a given pair of repeaters, each order in the sequence can be programmed by the operator by means of the keyboard of the board 14.

All the test address, switching control and gain variation control signals are transmitted from the circuits 15, 16, 18 over the bus 110 to the output power-separation filter 11 which mixes these signals with the data signal transmitted over the forward channel F. These signals are in the form of binary coded signals modulated by two generally low-frequency carriers outside the effective frequency ranges of the data signals. One of the two carrier frequencies modulates the clock signal which is delivered from the time base 150 and the other modulates all the other signals. The pilot regulating signal and any test signals are signals of the same type as the data signals and are modulated at frequencies inserted between the effective frequency range of the data signals.

During monitoring of the line, a pilot regulating signal generally used in prior-art remote monitoring systems is preferably transmitted continuously by the generator 16 via the output filter 11 over the forward channel F. This pilot signal is looped through a filtering and coupling circuit 21 which is interconnected between the forward and backward channels F, B in the monitored station 2. It is then transmitted over the backward channel B, sampled by the input power-separation filter 12 and finally transmitted to the fault detector 17. The detector 17 compares the level of the pilot signal which is transmitted via the entire line, with the level of the pilot signal which is initially transmitted through a clipper circuit 19 from the generator 16. As soon as the difference between these levels exceeds a predetermined value, the successive regulating sequences of the line sections are effected by the central remote control unit 13.

However, according to other aspects of the invention, a pilot signal may be transmitted from the monitoring station 1 to the monitored station 2 which also includes a fault detector analogous to the detector 17, to analyze this first pilot signal. A second pilot signal is transmitted by a generator contained in the monitored station 2, from the latter station 2 to the monitoring station 1 over the backward channel B, and is analyzed by the fault detector 17. The monitored station 2 is connected by an auxiliary link to the central unit 13 and detects the transmission faults on the forward channel F while the fault detector 17 of the monitoring station detects the transmission faults on the backward channel B. According to other aspects of the invention, which if desired may be combined with the previous aspects, the fault detection may be based on analysis of the data signals when they are digital. In the latter case, an error rate above a predetermined value is detected by checking the line code of the received data signal or the absence thereof.

Figure 2:
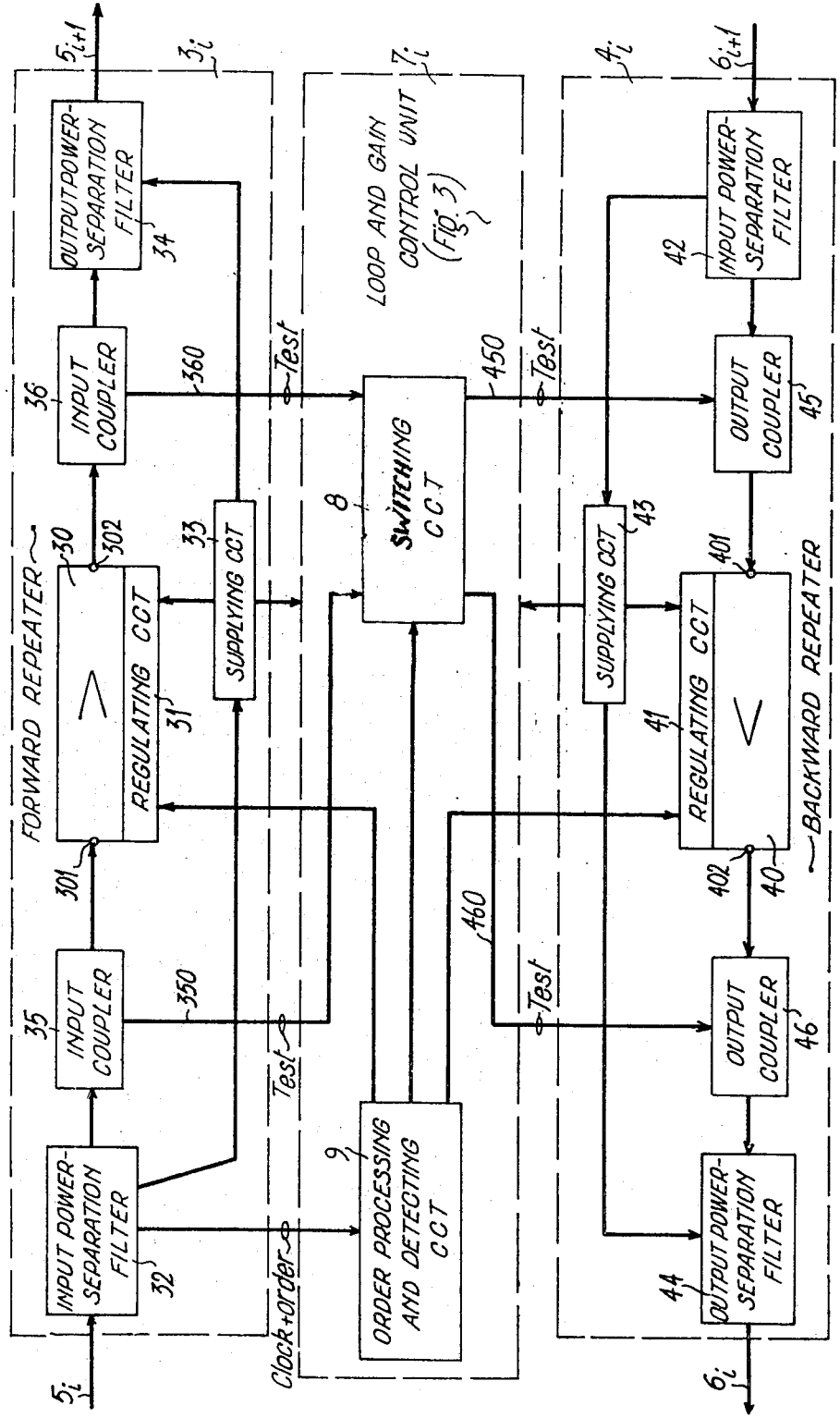
FIG. 2 is a block diagram of a pair of forward and backward intermediate amplification circuits of the line which includes a loop and gain control unit.

Referring now to FIG. 2, each pair of repeaters $3_i$, $4_i$ is associated with a loop and gain control unit $7_i$. A repeater $3_i$ or $4_i$ contains a circuit 30 or 40 for amplifying and regulating and, if required, regenerating and reshaping the data signal received from the upstream section $5_i$ or $6_{i+1}$. A pair of repeaters also contains additionally a circuit for remote or local supplying all of the circuits making up the repeaters, including those of unit $7_i$ according to this invention, and preferably protective circuits in respect of accidental over-voltage. However, unlike the known intermediate amplification circuits or repeaters, the regulating circuit 31, 41 of each repeater $3_i$, $4_i$ no longer contains a control loop controlled by a pilot regulating signal which enables the amplification gain of the repeater to be automatically and locally regulated by means of one or more linear variable elements, without control by the monitoring station. According to the invention, each repeater has a static regulating circuit 31 or 41 which equalizes the amplification gain, not to a preset threshold by local comparison of a reference voltage and the voltage of the pilot signal, but to a precise value which is transmitted at the command of the remote control unit 13 of the monitoring station 1 and after analysis of the tests carried out by the fault detector or detectors such as 17.

Apart from the circuit 30, 40, each repeater $3_i$, $4_i$ is provided upstream with an input power-separation filter 32, 42 which separates the data signal from the d.c. which is normally carried by the forward or backward channel and transmitted by the remote supply bays of the monitoring station 1 or the monitored station 2 when such remote supply exists. This direct current is re-transmitted to the next repeater $3_{i+1}$, $4_{i-1}$ by means of a supplying circuit 33, 43 and through an output power-separation filter 34, 44. The supply circuits 33 and 43 are intended to supply the different components of the amplification and regulating circuits 30, 31, 40, 41 and those of the control unit $7_i$.

Two input couplers 35 and 36 are interconnected on the forward channel F at the input and the output of the forward amplification circuit 30, as illustrated in FIG. 2, or, more generally, of the forward repeater $3_i$. Two output couplers 45 and 46 are interconnected on the backward channel B at the input and the output of the backward amplification circuit 41, as illustrated in FIG. 2, or, more generally, of the backward repeater $4_i$. The input couplers 35 and 36 route the pilot signal and the test signals to a loop switching circuit 8 of the control unit $7_i$ via two links 350 and 360. One of the output couplers 45 and 46 mixes the pilot signal and the test signals transmitted from the switching circuit 8 through a link 450, 460, with the data signal from the backward channel B when the pair of repeaters $3_i$, $4_i$ is remote located.

Figure 3:
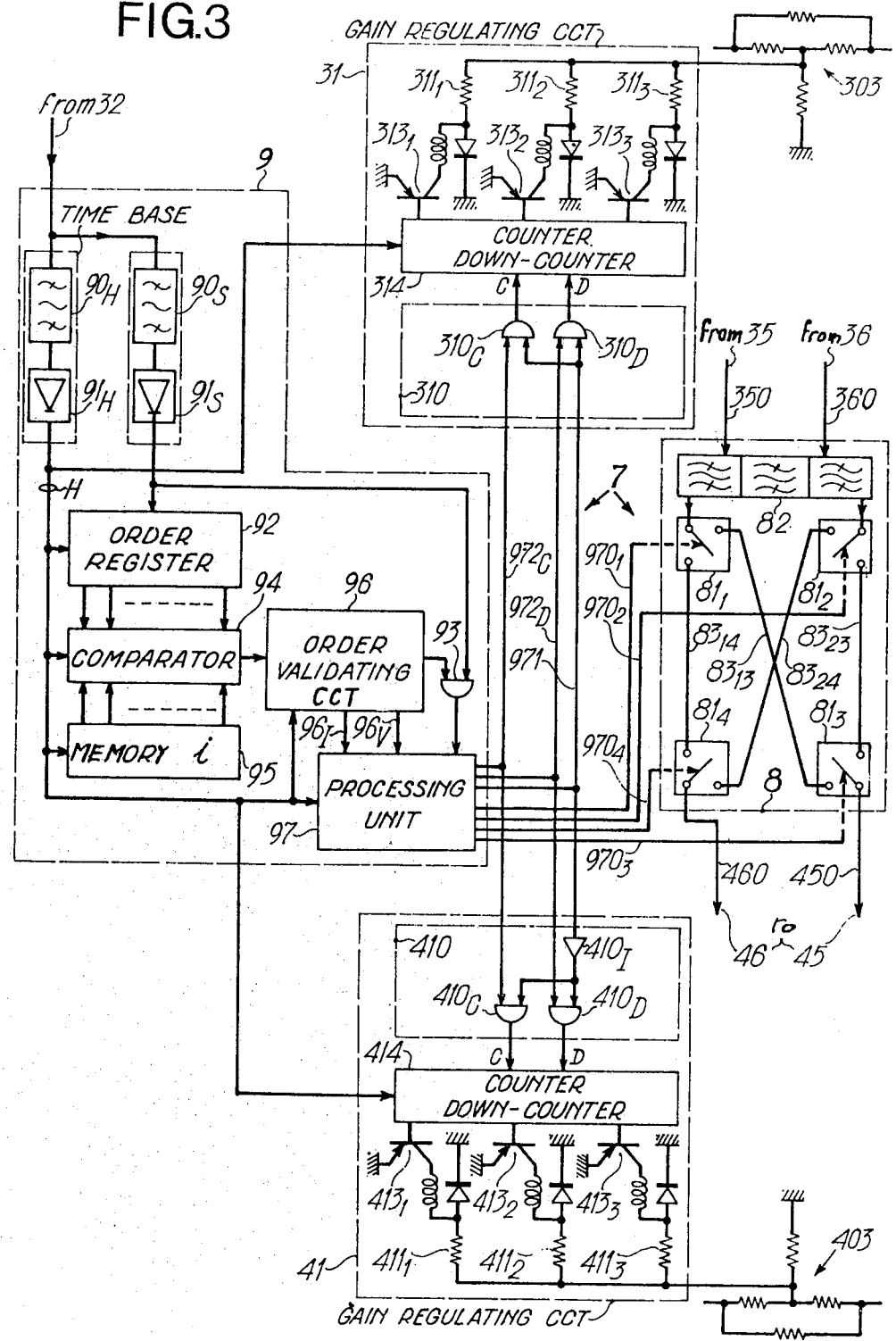
FIG. 3 is a more detailed block diagram of the order processing and detecting circuit and switching circuit of the loop and gain control unit shown in FIG. 2, together with the gain regulating circuits of the two intermediate amplification circuits.

FIG. 3 shows in detail a preferred structural organisation of the loop and gain control unit $7_i$. In addition to the loop switching circuit 8, the unit $7_i$ comprises an order processing and detecting circuit 9 for detecting and processing the orders which are transmitted from the central unit 13 of the monitoring station 1.

Two band-pass filters $90_H$ and $90_S$ are included in the circuit 9 and are connected to the input power-separation filter 32. The circuit 9 also comprises two demodulators $91_H$ and $91_S$ which are connected to the outputs of the filters $90_H$ and $90_S$, respectively. Each demodulator $91_H$, $91_S$ contains a threshold detector and a pulse shaping circuit for the filtered and demodulated pulses. The system $90_H$, $91_H$ acts a time base and detects and re-shapes the clock signal H transmitted by the time base 150 of the monitoring station. The system $90_S$, $91_S$ detects and re-shapes all the order signals, i.e. the address, loop control and gain variation control signals transmitted by the registers 151, 152, 180 and 181 of the monitoring station. The clock signal H serves as a reference signal for all the circuits of the control unit $7_i$. In this connection, according to another aspect of the invention, the function of the time base 150 may be replaced by that of a rhythm recoverying circuit contained in a time base of each forward repeater $3_i$ and restoring a clock signal synchronized with the forward data signal.

The output of the demodulator $91_S$ transmits in series and restores in binary coded form all the order signals to an order register 92 and one of the inputs of an AND gate 93. The binary coded order signals for the two repeaters of a same pair have a predetermined format. The register 92 is like a shift register. The content and format of a received order signal from the register 92 are compared with that of the coded identification number i or the address of line section $S_i$ by means of a comparator 94. This address i is previously recorded in a read-only memory 95. If the comparator 94 recognizes the address signal transmitted by the register 151 at the start of a remote locating and regulating sequence, it transmits a control signal at its output to open the AND gate 93 via an order validation circuit 96. The format of each order signal received is then compared with that of the address contained in the memory 95 and is validated by the circuit 96. If the order signal is validated, the circuit 96 transmits a validation signal over wire $96_V$ to a processing unit 97 which processes the program corresponding to the order signal. In the contrary case, the unit 97 receives via wire $96_I$ an invalidation signal which prevents any of the controls of the switching circuit 8 and of the regulating circuits 31, 41. If the received order signal is validated, this signal is transmitted via the AND gate 93 to the processing unit 97 and is compared in an order address register which is contained in the unit 97 and which activates the corresponding control program at the corresponding address of a program memory.

After recognizing the address i, the processing unit 97 transmits over the four-wire bus $970_1$ to $970_4$ positioning signals for the switches of the switching circuit 8 in response to each loop switching signal which is transmitted by the loop register 152. Then the unit 97 brings the wire 971 to the "1" or "0" condition in response to the address signal of the forward repeater $3_i$ or backward repeater $4_i$ which is transmitted from the repeater address register 180, and transmits a positive pulse over the wire $972_C$ or $972_D$ according to the sign of the gain deviation and in response to each gain variation control signal which is transmitted from the gain deviation register 181.

To carry out the four types of looping, the switching circuit 8 comprises four three-terminal switches $81_1$ to $81_4$ which are shown in the inoperative state in FIG. 3. The input terminal of the two input switches $81_1$ and $81_2$ are connected respectively to the two input couplers 35 and 36 via a set of band-pass filters 82 which samples the pilot regulating signal and other test signals from the forward channel F. The output terminals of the two output switches $81_3$ and $81_4$ are connected respectively to the output couplers 45 and 46 of the backward channel B. Each switch has an inoperative state in which the switch is open—as shown in FIG. 3—and two working states. One working or closed state of an input switch $81_1$, $81_2$ corresponds to the connection of its input terminal to one of its two output terminals. One working or closed state of an output switch $81_3$, $81_4$ corresponds to its output terminal being connected to one of its two input terminals. The arrangement of the switching circuit 8 is such that the two ouput terminals of the first input switch $81_1$ are respectively connected to first input terminals of the output switches $81_3$ and $81_4$ through two wires $83_{13}$ and $83_{14}$; and the two output terminals of the second input switch $81_2$ are respectively connected to second input terminals of the output switches $81_3$ and $81_4$ through two wires $83_{23}$ and $83_{24}$.

Each of the three states of a switch $81_1$ to $81_4$ is controlled by a suitable logic signal transmitted over the associated wire $970_1$ to $970_4$. Thus, in a test sequence relating to one pair of repeaters $3_i$, $4_i$, at least one of, or, preferably, the following four successive loops are produced:

(a) output 302 of the forward amplification circuit 30 is looped:
  (a1) either, as known, to the input 401 of the backward amplification circuit 40 through the elements 36, 360, 82, $81_2$, $83_{23}$, $81_3$, 450 and 45;
  (a2) or to the output 402 of the backward amplification circuit 40 through the elements 36, 360, 82, $81_2$, $83_{24}$, $81_4$, 460 and 46;

(b) the input 301 of the forward amplification circuit 30 is looped:
  (b1) either to the input 401 of the backward amplification circuit 40 via the elements 35, 350, 82, $81_1$, $83_{13}$, $81_3$, 450 and 45;
  (b2) or to the output 402 of the backward amplification 40 via the elements 35, 350, 82, $81_1$, $83_{14}$, $81_4$, 460 and 46.

Each of four loops lasts long enough for carrying out the tests, calculations and comparisons of the test signal or signals which are looped in the switching circuit 8 and are transmitted to the fault detector 17 and the central remote control unit 13. The unit 13 compares the results of these tests relating to these four loops and precisely locates an attenuation loss in the channel sections $5_i$ and $6_i$ or in an intermediate amplification circuit $30_i$ or $40_i$ for each line section $S_i$. The reason for this is that the loops (a1), (a2), (b1) and (b2) only take the following into account respectively:

(a1) the channel sections $5_i$ and $6_i$, the forward amplification circuit $30_i$ and the backward amplification circuit $40_i$;

(a2) the channel sections $5_i$ and $6_i$ and the forward amplification circuit $30_i$;

(b1) the channel sections $5_i$ and $6_i$ and the backward amplification circuit $40_i$;

(b2) the channels sections $5_i$ and $6_i$.

At this stage, if the fault detector 17 and the central remote control unit 13 detect an attentuation fault, e.g. from one of the amplification circuits $30_i$ or $40_i$, the unit 13 orders the transmission of an address signal of the defective forward or backward repeater and gain variation control signals from the gain variation control circuit 18. The address signal is transmitted from the repeater address register 180 and is received by the processing unit 97, which controls through the wire 971 opening of the access circuit 310, 410 of the regulating circuit 31, 41 associated with the defective amplification circuit 30, 40.

According to the embodiment shown in FIG. 3, each gain regulation circuit 31 or 41 comprises a network of resistors in parallel and/or in series. In the example illustrated, this network comprises three parallel resistors $311_1$ to $311_3$ or $411_1$ to $411_3$ which are intended to be selectively interconnected in the negative feedback loop 303 or 403 of the amplifier or amplifiers of the amplification circuit 30 or 40. Each negative feedback loop 303 403 is shown here in the form of a bridged T-shaped resistor network. These selective interconnections are controlled by associated switches $313_1$ to $313_3$ or $413_1$ to $413_3$, e.g. transistors. The control electrodes of these transistors are connected to the outputs of a counter and down-counter 314, 414. The counting and down-counting inputs C and D of the counter and down-counter 314 or 414 are respectively connected to the outputs of two AND gates $310_C$, $310_D$ or $410_C$, $410_D$ of the access circuits 310 or 410.

For example, when the processing unit 97 identifies the address of the forward repeater $3_i$, it brings the wire 971 to the "1" condition, thus opening the access AND gates $310_C$ and $310_D$ and closing the AND access gates $410_C$ and $410_D$ via an inverter $410_I$. If the gain of the amplification circuit 30 is to be increased or decreased, the program memory of the unit 97 transmits a pulse over wire $972_C$ or $972_D$ to the gate $310_C$ or $310_D$ in response to each gain increase or decrease control signal transmitted by the gain deviation register 181 of the monitoring station 1. The counter and down-counter 314 increases or decreases by the number of received pulses and connects certain resistors $311_1$ to $311_3$ in parallel in the negative feedback loop 303, thus fixing a new gain for the forward amplification circuit 30. Similarly, after the address of the backward amplification circuit 40 has been received in the processing circuit 97, the gain of the backward amplification circuit 40 can be modified by means of a number of pulses which are delivered to the counter and down-counter 414 via the access circuit 410.

All the connection elements of the loop and gain control unit $7_i$ are reset to the inoperative state, for example, on a second reception of the address signal of the line section $S_i$ by the order register 92, and this results in closure of the AND gate 93 under the control of the order validating circuit 96.

Although the invention has been particularly shown and described with reference to the preferred embodiment thereof, it will be understood by those skilled in the art that the foregoing and other changes in form and detail may be made therein without departing from the spirit of the invention. It is, therefore, intended that this invention be limited only by the scope of the amended claims. For example, at the monitoring and monitored stations:

(a) the central remote control unit 13 may be a microprocessor specializing solely in regulating the gain from the data signals by means of a predetermined gain variation program or a step-by-step program using one or more control signals as pilot signals for each pair of intermediate amplification circuits. In that case, the continuous transmission of the pilot signal is no longer required and the test and pilot frequency generator 16 and the clipper circuit 19 are used solely after remote location of each pair of intermediate amplification circuits;

(b) the coupling and filtering circuit 21 of the monitored station 2 can be dispensed with; as already stated, in that case, a pilot signal is transmitted from the monitoring station 1 in the forward transmission direction and is monitored by a fault detector of the monitored station 2 which will alert the central unit 13 in the event of faults on the forward transmission channel F; similarly, another pilot signal is transmitted from the monitored station 2 in the backward transmission direction and is monitored by the fault detector 17;

(c) the transmission of the clock signal produced by the time base 150 is not strictly necessary; since, as already stated, a local time base synchronized with that of the terminal equipment 10 of the monitoring station 1 may then inserted in each loop and again control unit $7_i$ to $7_N$, transmission errors being avoided by redundant codes and/or information repeats or alternatively the clock signal can be recovered from the control signals transmitted in the line;

(d) the control signal or signals are not necessarily low-frequency signals but may, instead, be modulated in a ultra-high frequency channel of the spectrum of the data signal in a radio link or in a digital, analog or hybrid optical fibre line;

(e) low-frequency control signals can also be transmitted over an auxiliary cable link, such as the kind used for the remote supply of the repeaters in certain transmission systems such as those using optical fibres, for example.

At each intermediate amplification and possibly regeneration circuit 30, 40, the gain regulating circuit may comprise an adjustable element, such as a adjustable impedance network or a differential resistance network, a linear variation element, such as a varicap diode, a thermistor, a photo-resistor or a magneto-resistor controlled by a step-by-step device such as a counter/down-counter or, preferably, a device directly transmitting the required gain deviation in the form of a suitable physical quantity, such as a current, a voltage, a power, or the like. In the latter case, the gain can vary continuously in a predetermined range. According to another aspect, the afore-mentioned variable element may be that of an adjustable attenuator which is inserted upstream or downstream in each intermediate amplification circuit. The attenuation coefficient of this attenuator is then controlled according to the gain deviation which is transmitted by the register 181 of the monitoring station 1.

In addition, in order to reduce the line current consumption, each validating circuit 96 associated with a pair of intermediate amplification circuits can be designed to control the supply of the loop control and gain variation control elements (97, 8, 31, 41) from the remote supply circuits 33, 43 or purely local supply circuits during the period of remote location and testing of the amplification circuit pair. When the gain deviation is transmitted directly in coded form on the forward transmission channel F, the gain deviation signal can be used as acknowledgement of receipt for the remote located unit 7 which, after corresponding modification of the gain, automatically closes its AND gate 93 for reception of the control and address signals.

What I claim is:

1. In a remote monitoring system for monitoring remote amplification in line sections of a bidirectional data transmission line interconnected between a monitoring station and a monitored station;
   each line section comprising:
   a forward transmission channel transmitting a first data signal from said monitoring station to said monitored station which is looped through repeaters with said monitoring station;
   a forward amplification circuit comprising amplifying means for said first data signal and regulating means for said forward circuit amplifying means;
   a backward transmission channel transmitting a second data signal from said monitored station to said monitoring station;
   a backward amplification circuit comprising amplifying means for said second data signal and regulating means for said backward circuit amplifying means;
   detecting means for an address signal not modified by a repeater and delivered on the forward transmission channel of said line section from said monitoring station; and
   switching means controlled by said address signal detecting means connecting the output of said forward circuit amplifying means to the input of said backward circuit amplifying means;
   said monitoring station comprising:
   delivering means for said address signals in the forward direction on said forward transmission channel to provide the remote address location of a line section;
   register delivering means for at least one test signal and a pilot signal over the forward transmission channel which is looped with the said repeaters through the monitoring and monitored stations;
   analyzing means for detecting transmission faults after said forward and backward amplification circuits of the remote located line section have been looped through said monitoring station, from said test signal and said pilot signal which have been retransmitted on the backward transmission channel of said line from said monitored station;
   means for delivering address and gain variation control signals in said forward direction on said forward transmission channel after looping of said remote located line section through said monitoring station in response to the transmission fault analysis in said analyzing means;
   each of said line sections further comprising means controlled by said address signal detecting means for validating all the amplification circuit address and gain variation control signals relating to said line section; and further comprising
   means for controlling said gain regulating means of each of said backward and forward amplification circuits of said line section in response to the validated amplification circuit address and gain variation control signal.

2. A remote monitoring system as claimed in claim 1, in which said gain regulating means of each of said amplification circuits comprises means for counting and down-counting the gain variation control signals in order to increase or decrease the gain of said amplifying means of said amplification circuit step-by-step.

3. A remote monitoring system as claimed in claim 2, including a negative feedback loop in each of said amplifying means of a line section in which said gain regulating means of each of said amplification circuits comprises a network of static elements which are selectively interconnected in the negative feedback loop of said amplifying means of said amplification circuit under the control of said counting and down-counting means.

4. A remote monitoring system as claimed in claim 1, in which the unlooping in said switching means of a remote located line section is controlled by said address detecting means in response to a second detection of the address signal of said remote located line section.

5. A remote monitoring system as claimed in claim 1, in which said gain regulating means of each of said amplification circuits comprises means for changing the gain of said amplifying means of said amplification circuit by a gain deviation included in said coded gain variation control signal.

6. A remote monitoring system as claimed in claim 5, including a negative feedback in each of said amplifying means of a line section in which said gain regulating means of each of said amplification circuits comprises at least one adjustable element inserted in the negative feedback loop of said amplifying means of said amplification circuit, said adjustable element being adjusted in dependence on said gain deviation under the control gain changing means.

7. A remote monitoring system as claimed in claim 5, in which said gain regulating means of each of said amplification circuits comprises adjustable attenuating means introduced at one of the input and output terminals of said amplification circuits, said attenuating means being adjusted in dependence on the gain deviation under the control of said gain changing means.

8. A remote monitoring system as claimed in claim 1, in which said switching means of each of said line sections comprises four selective loop connections in which said monitoring section comprises means for delivering four loop switching signals in said forward direction on said forward transmission channel and in which said validating means of each of said line section validates said four loop switching signals respectively in order to carry out in said switching means, not only the loop connection defined in claim 22, but also the following three connections respectively in response to said loop switching signals:

connection of said output of said forward circuit amplifying means to the output of the backward circuit amplifying means;

connection of the input of said forward circuit amplifying means to said input of said backward circuit amplifying means; and connection of said input of said forward circuit amplifying means to said output of said backward circuit amplifying means.

9. A remote monitoring system as claimed in claim 8, in which each line section comprises means interconnected to said input and output of said forward circuit amplifying means and to the inputs of said switching means for sampling and filtering said test signal and pilot signal transmitted with said first data signal on said forward transmission channel and means interconnected to said input and output of said backward circuit amplifying means and to the outputs of said switching means for mixing said test signal and pilot signal with said second data signal transmitted on said backward transmission channel after remote location of said line section.

10. A remote monitoring system as claimed in claim 1, in which said address and gain variation control signals are coded signals modulated at a first frequency outside of the effective frequency range of said data signals.

11. A remote monitoring system as claimed in claim 10, in which said address and gain variation control signals allocated to a line section have the same predetermined digit number.

12. A remote monitoring system as claimed in claim 10, in which said monitoring station comprises means for delivering a clock signal on said forward transmission channel during each sequence for the remote location and gain regulation of a line section, said clock signal being modulated at a frequency outside of said effective frequency range of said data signals and differing from said first frequency.

13. A remote monitoring system as claimed in claim 1, in which each of said line sections comprises means synchronizing a time base of said remote located line section for recovering a clock signal from one of the following signals, said test signal, said pilot signal, said address and gain variation control signals, and said first data signal.

14. A remote monitoring system for remote monitoring line sections of a bidirectional data transmission line which is interconnected between a monitoring station and a monitored station, each of said line sections comprising:

a forward transmission channel conveying in the forward direction from said monitoring station to said monitoring station a first data signal;

forward amplification means for amplifying said first data signal;

a backward transmission channel conveying in the backward direction from said monitored station to said monitoring station a second data signal;

backward amplification means for amplifying said second data signal; and means for detecting an address signal delivered on the forward transmission channel of said line section from said monitoring station;

said monitoring station comprising:

means for delivering said address signals in said forward direction on said forward transmission channel in order individually to provide remote location of a line section;

means for delivering at least one test signal and a pilot signal over said forward transmission channel;

analyzing means for detecting transmission faults from after said forward and backward amplification means of the remote located line section have been interconnected through said monitoring station, from said test signal and said pilot signal after they have been retransmitted on the backward transmission channel of said line from said monitored station; and means for delivering four loop switching control signals in said forward direction on said forward transmission channel after remote locating of a line section from said monitoring station;

each of said line sections also comprising:

validating means controlled by said address signal detecting means for validating all the address and loop switching control signals relating to said line section; and switching means controlled by said validating means for selectively carrying out four connections respectively in response to said four loop switching control signals;

said switching means comprising:

connecting means for the connection of the output of said forward amplifying means to the input of said backward amplifying means;

connecting means for the connection of said output of said forward amplifying means to the output of the backward amplifying means;

connecting means for the connection of the input of said forward amplifying means to said input of said backward amplifying means; and connecting means for the connection of said input of said forward amplifying means to said output of said backward amplifying means.

15. A remote monitoring system as claimed in claim 14, in which the unlooping in said switching means of a remote located line section is controlled by a second detection of its address signal from said address signal detecting means.

16. A remote monitoring system as claimed in claim 14, in which each line section comprises filter and interconnect means interconnected to said input and output of said forward circuit amplifying means and to the inputs of said switching means for sampling and filtering said test signal and pilot signal transmitted with said first data signal on said forward transmission channel and means interconnected to said input and output of said backward amplifying means and to the outputs of said backward amplifying means and to the outputs of said switching means for mixing said test signal and pilot signal with said second data signal transmitted on said backward transmission channel after remote location of said line section.

17. A remote monitoring system as claimed in claim 14, in which said address and loop switching control signals are coded signals modulated at a first frequency outside of the effective frequency range of said data signals.

18. A remote monitoring system as claimed in claim 17, in which said address and loop switching control signals allocated to a line section have the same predetermined digit number.

19. A remote monitoring system as claimed in claim 17, in which said monitoring station comprises means for delivering a clock signal on said forward transmission channel during each sequence for the remote location and loop switching of a line section, said clock signal being modulated at a frequency outside of said effective frequency range of said data signals and differing from said first frequency.

20. A remote monitoring system as claimed in claim 14, in which each of said line sections comprises means synchronizing a time base of said remote located line section for recovering a clock signal from one of the following signals, said test signal, said pilot signal, said address and loop switching control signals, and said first data signal.

* * * * *